(12) United States Patent
Dubois et al.

(10) Patent No.: US 7,880,902 B2
(45) Date of Patent: Feb. 1, 2011

(54) CONTACTLESS OPTICAL PROBE AND DEVICE AND METHOD MAKING USE THEREOF

(75) Inventors: Frederic Dubois, Antony (FR); Michael Bray, Paris (FR)

(73) Assignees: Essilor International (Compagnie Generale d'Optique), Charenton-le-Pont (FR); MB Optique, Paris (FR)

( * ) Notice: Subject to any disclaimer, the term of this patent is extended or adjusted under 35 U.S.C. 154(b) by 588 days.

(21) Appl. No.: 11/795,285

(22) PCT Filed: Jan. 11, 2006

(86) PCT No.: PCT/FR2006/000059
§ 371 (c)(1),
(2), (4) Date: Jul. 16, 2007

(87) PCT Pub. No.: WO2006/075090
PCT Pub. Date: Jul. 20, 2006

(65) Prior Publication Data
US 2008/0137100 A1    Jun. 12, 2008

(30) Foreign Application Priority Data
Jan. 14, 2005    (FR) .................................... 05 00405

(51) Int. Cl.
*G01B 11/14* (2006.01)
(52) U.S. Cl. ...................................... 356/625; 356/124
(58) Field of Classification Search ......... 356/124–127, 356/625, 630
See application file for complete search history.

(56) References Cited

U.S. PATENT DOCUMENTS

| 3,544,796 A | * | 12/1970 | Baker ....................... 250/201.1 |
| 4,038,931 A | * | 8/1977 | Kosrow et al. .............. 112/272 |
| 4,464,050 A | | 8/1984 | Kato et al. |
| 4,767,211 A | | 8/1988 | Munakata et al. |
| 5,159,412 A | * | 10/1992 | Willenborg et al. ......... 356/445 |
| 5,465,043 A | * | 11/1995 | Sakai .......................... 324/96 |
| 2005/0189478 A1 | * | 9/2005 | Lagasse ...................... 250/216 |

FOREIGN PATENT DOCUMENTS

| EP | 0 939 294 | 9/1999 |
| EP | 1371939 | 12/2003 |

OTHER PUBLICATIONS

"Confocal Profilometer With Nanometric Vertical Resolution", Butler et al., Optics Communications, North-Holland Publishing Co., vol. 100, No. 1-4, Jul. 1993, pp. 87-92, XP000380427.

* cited by examiner

*Primary Examiner*—Tarifur Chowdhury
*Assistant Examiner*—Tara S Pajoohi
(74) *Attorney, Agent, or Firm*—Young & Thompson

(57) ABSTRACT

The probe comprises a light source (20), means for shaping (24, 25, 21) the beam emitted by said light source and the beam coming from a surface arranged close to a target distance, an optical detector unit (22), comprising a pinhole diaphragm (26) and a photoelectric detector (28), providing a voltage peak (31) when said surface is at said target distance and further comprising a diaphragm (27) with a hole larger than said pinhole and a photoelectric detector (29), providing a voltage greater than that produced by said detection sensor (28), except when said surface is a the target distance. The method uses the probe to measure the thickness of an optical lens.

20 Claims, 4 Drawing Sheets

CONTACTLESS OPTICAL PROBE AND DEVICE AND METHOD MAKING USE THEREOF

BACKGROUND OF THE INVENTION

1. Field of the Invention

The invention relates to surface probes.

2. Description of the Related Art

There are known already mechanical probes the end whereof comes into contact with the surface the position of which is to be determined. When the distal end of the probe comes into contact with the surface facing which it is disposed, the probe transmits via a mechanical strain sensor a signal indicating the abutment of the probe against that surface. Reading the position of the probe against a scale indicates its position, from which that of the surface is deduced.

There are also known, in particular from the American patent U.S. Pat. No. 6,713,718 and the British patent 2 337 815, contactless optical probes that emit a light beam and, according to the beam reflected by the surface, detect whether or not they are situated at a predetermined distance therefrom.

SUMMARY OF THE INVENTION

The invention aims to provide an optical probe of the same kind that is simple, convenient and effective.

To this end it proposes an optical probe including optoelectrical means adapted to assume a predetermined electrical state if and only if said probe is situated at a preset target distance from a surface that is at least partially reflective, said probe including:

a light source;

shaping means for shaping the beam emitted by said light source into an incident beam converging toward a focus situated at said target distance and for shaping the beam coming from said surface by virtue of reflection of said incident beam when said surface is in the vicinity of said target distance into a beam to be detected converging toward a focus, separate from said light source, occupying a predetermined location when said surface is at said target distance; and an optical detection system including a diaphragm including a pinhole, disposed at said predetermined location, and a photoelectric sensor producing a voltage peak when said surface is at said target distance;

characterized in that:

said shaping means are adapted also to shape said beam coming from said surface into a discrimination beam converging toward a focus separate from said light source and from said focus of the beam to be detected, occupying another predetermined location when said surface is at said target distance; and said probe further includes an optical discrimination system including a diaphragm including a hole larger than said pinhole, disposed at least in the vicinity of said other predetermined location, and a photoelectric sensor producing a voltage higher than said voltage produced by said detection sensor except when said surface is at the target distance, whereby said predetermined electrical state is that in which the voltage produced by the detection sensor is greater than the voltage produced by the discrimination sensor.

An optical probe of this type, that does not come into contact with the surface whose position it is required to know, so that there is no risk of it harming that surface, offers the advantage that it can be produced from simple optical components of low cost.

It is furthermore possible, for example by making use of the features set out hereinafter, to produce an optical probe that is particularly compact, to the point where it can replace a mechanical probe.

According to features preferred as much for reasons of simplicity and convenience as of fabrication and use:

said shaping means include: a detection semi-reflecting splitter block adapted to orient said beam to be detected toward said detection system, a discrimination semi-reflecting splitter block adapted to orient said discrimination beam toward said discrimination system, and a lens assembly;

said detection splitter block is disposed between said light source and said discrimination splitter block and said discrimination splitter block is disposed between said detection splitter block and said lens assembly;

said detection splitter block and said discrimination splitter block are in contact with each other;

said detection system is disposed facing said detection splitter block transversely to the optical axis of the probe and said discrimination system is disposed facing said discrimination splitter block transversely to the optical axis of the probe;

said detection splitter block and said discrimination splitter block each include a semi-reflecting mirror inclined at 45° to the optical axis of the probe; and/or said mirrors have a reflection/transmission ratio of 50/50; or said mirror of the detection splitter block has a reflection/transmission ratio of 50/50 and said mirror of the discrimination splitter block has a reflection/transmission ratio of 10/90;

said pinhole has a diameter from 10 to 30 micrometers; and/or said lens assembly is formed by the association of a plano-convex lens and an aspherical lens.

According to other features preferred for the same reasons as those indicated hereinabove:

said light source is a laser diode with integrated amplifier;

the emission wavelength of said laser diode is from 635 to 1600 nanometers; and/or light is emitted directly from said laser diode as far as the detection splitter block.

This solution contributes to making the probe more compact and can be made use of independently of the features set out previously.

According to other features preferred for the same reasons as those indicated hereinabove, said light source, said shaping means, said detection system and said discrimination system are fastened together by encapsulating them by casting a resin that holds them in position relative to each other.

This solution ensures that the various optical components are held in a position relative to each other that is stable over time which enables the probe to retain all its optical characteristics. This solution can be made use of independently of the features set out previously.

A second aspect of the invention is directed to a device for measuring the thickness of an object the surfaces whereof between which the thickness is to be measured are at least partly reflective, characterized in that said device includes:

two probe arms on respective opposite sides of said object each including a probe as disclosed hereinabove and displacement means for said probes;

for each probe arm, a reading head for determining the position of that arm on a scale; and electronic units for controlling said displacement means, for reading the position of said probes and for calculating said thickness of said object when said probes are situated at said preset target distances.

A third aspect of the invention is directed to a method for measuring the thickness of an optical lens characterized in that it includes the step of positioning the probe of each probe arm of the thickness measuring device as disclosed hereinabove at said target distance from said surface facing which it is disposed and the step of determining said thickness by comparison of said positions of said probes.

BRIEF DESCRIPTION OF THE DRAWINGS

The features and advantages of the invention will emerge from the following description, given by way of nonlimiting but preferred example, with reference to the appended drawings, in which.

DETAILED DESCRIPTION OF THE INVENTION

Figure 1:
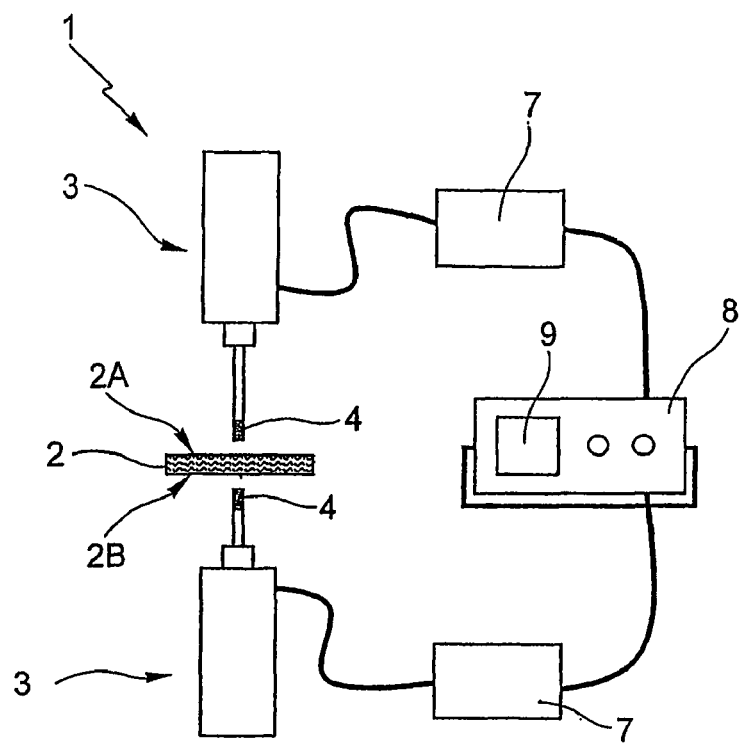
FIG. 1 is a diagrammatic view of a thickness measuring device of the invention.

FIG. 1 is a diagrammatic representation of a measuring device 1 of the invention applied to measuring the thickness of ophthalmic lenses 2 such as spectacle lenses. The position of each principal face 2A, 2B of the lens 2 is determined by optical probes 3 the distal ends 4 whereof are respectively placed to face each of the surfaces 2A, 2B the position whereof is to be determined. The optical probes 3 are identical as are the electronic units 7. Each determines the position of a respective one of the surfaces 2A and 2B.

Figure 2:
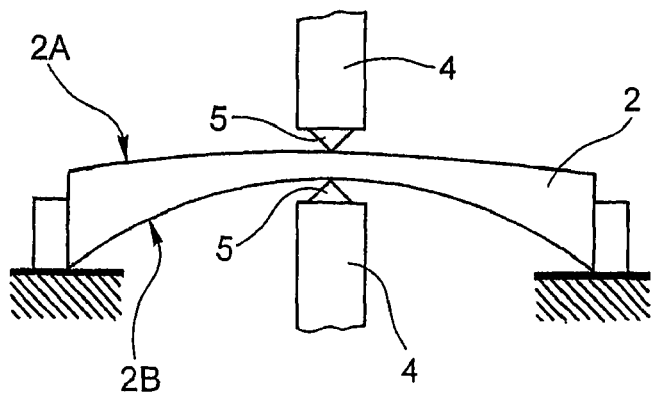
FIG. 2 is a more detailed view to a larger scale of the distal ends of the probes of that device, also showing an ophthalmic lens being measured and the lens support that the device includes.

Each probe 3 emits an incident light beam 5 (FIG. 2). As explained hereinafter, the analysis by the probe 3 of the light reflected by the surface 2A or 2B facing which it is disposed determines whether the distal end of the probe is situated or not at a predetermined target distance from that surface.

Figure 3:
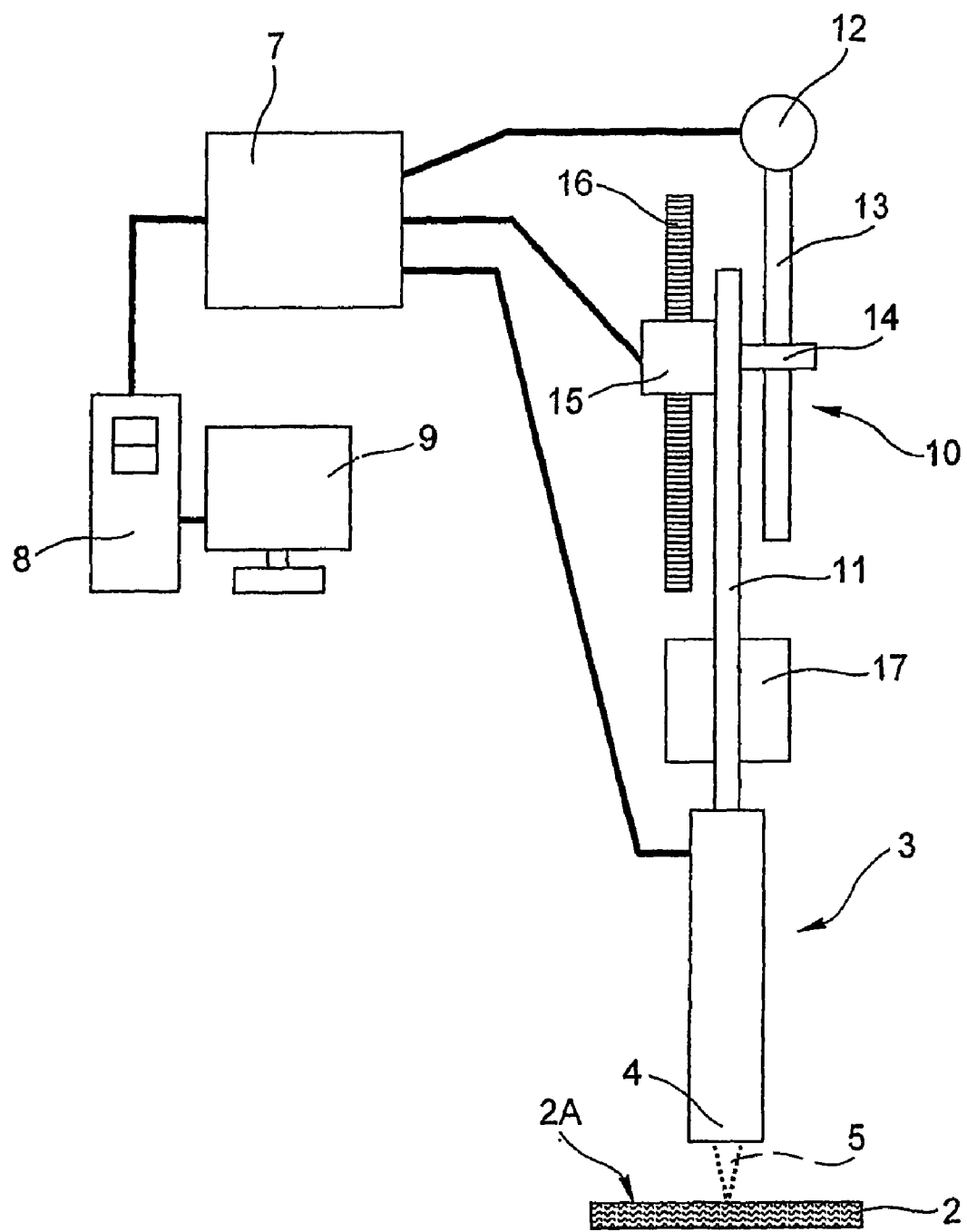
FIG. 3 is a view similar to FIG. 1 but showing in detail and in isolation one of the two optical probes of the invention and the processing, control and displacement means associated therewith.
Figure 4:
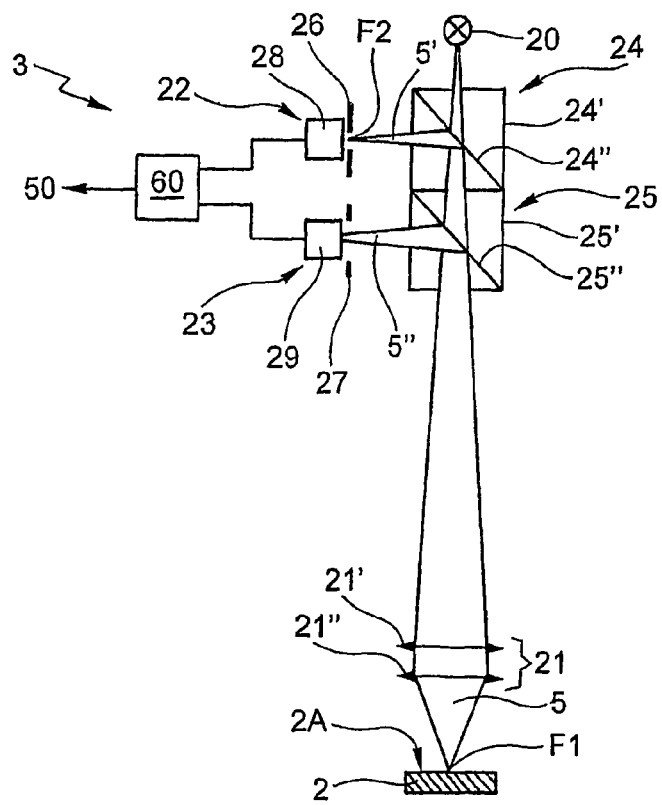
FIG. 4 is a diagrammatic view of the optical and optoelectrical portion of each probe.

In FIGS. 3 and 4 the probe 3 is represented facing the surface 2A, but the following description is equally valid for the other probe 3.

Each probe 3 is connected via an electronic unit 7 to a central processor and control unit 8 which optionally includes display means 9.

The probe 3 is associated with means 10 for displacement relative to the surface the position whereof is to be determined in order to form a probe arm.

These displacement means comprise a connecting rod 11 connected to the probe 3, a drive motor 12, a drive rod 13 and an attachment lug 14.

The rods 11 and 13 are linked by the attachment lug 14.

The rod 11 is connected to a reading head 15 that moves over a scale 16.

The displacement means 10 are completed by guide means 17 around the connecting rod 11.

The motor 12, the mobile reading head 15 and the probe 3 are connected to an electronic unit 7 providing the interface with a central unit 8 common to the two probes (FIG. 1).

In conformance with the invention, the optical probe 3 includes, as shown in FIG. 4, a light source 20, a detection system 22, a discrimination system 23 and shaping means.

These shaping means are disposed between the light source 20 and the surface 2A (respectively 2B) the position whereof is to be determined and include a detection splitter block 24, a discrimination splitter block 25 and a lens assembly 21.

The detection block 24 is disposed between the light source 20 and the discrimination block 25 and faces the detection system 22 along an axis transverse to the optical axis of the probe.

The discrimination block 25 is disposed between the detection block 24 and the lens assembly 21 and faces the discrimination system 23 along an axis transverse to the optical axis of the probe.

In the example illustrated, to optimize the compactness of the probe, the two blocks 24 and 25 are in contact.

The splitter blocks 24 and 25 each contain a semi-reflecting dichroic mirror 24" or 25" in a surround 24' or 25' of cubical shape. The semi-reflecting mirrors 24" and 25" are oriented in the diagonal plane of the cube extending from the edge of the cube situated closest to the light source 20 and the corresponding system 22 or 23 to the diagonally opposite edge, forming an angle of 45° with the optical axis of the probe.

The semi-reflecting mirrors have a 50/50 reflection/transmission ratio.

The lens assembly 21 in the example illustrated consists of a system of lenses 21' and 21" in contact: for example a plano-convex lens 21' associated with a molded aspherical lens 21".

The detection system 22 is formed of a diaphragm 26 with a pinhole placed against a photoelectric sensor 28 of the photodiode with integrated preamplifier type, for example.

The hole in the diaphragm 26 has a diameter of the order of 10 to 30 micrometers.

The discrimination system 23 is also formed of a diaphragm 27 placed against a photoelectric sensor 29 of photodiode with integrated preamplifier type, for example, but the diaphragm 27 of the discrimination system 23 has a hole of greater diameter than the pinhole in the diaphragm 26 in order to have a wider spatial sensitivity.

In the example shown a laser diode is used as the light source 20. The emissive zone of a laser diode is sufficiently small and sufficiently weakly divergent for it not to be necessary to add either an input diaphragm or a lens on the downstream side of the laser diode. The path of the light is therefore a direct path between the light source 20 and the detection block 24, which helps to make the probe more compact.

An emission wavelength from 635 to 1600 nanometers is suitable for the diode 20.

There will now be described the optical path of the light beam emitted by the laser diode 20 as far as the detection system 22 and the discrimination system 23.

A portion of the light flux emitted by the source 20 passes through the two semi-reflecting mirrors 24" and 25" without being deviated. This transmitted beam is shaped after passing through the lens assembly 21 into an incident beam 5 converging toward the focus F1 of the arrangement situated at a preset target distance.

The beam resulting from the reflection of the incident beam by the surface the position whereof is to be determined when it is in the vicinity of that target distance passes through the lens assembly 21 again, after which a portion of the light flux is directed by reflection at the semi-reflecting mirror 24" toward the detection system 22, along an axis transverse to the optical axis of the arrangement in order to form a beam 5' to be detected converging toward a focus F2 separate from the light source and occupying the center of the diaphragm 26 when the surface 2A (respectively 2B) is situated at the target distance.

The photoelectric sensor 28 placed behind the diaphragm 26 with the pinhole detects, as a function of the light received, the presence of this surface when it is situated at this preset target distance because, when this surface is at the focus F1, the beam 5' to be detected converges toward the focus F2 which at this point occupies the center of the diaphragm. The diaphragm 26 with the pinhole therefore allows a maximum of light to pass through it. Conversely, if there is a distance between the focus F1 and the surface the position whereof is to be determined, the reflected beam no longer converges toward the center of the diaphragm but toward a point offset axially along the optical axis of the arrangement: the reflected light is then virtually completely blocked by the opaque material around the pinhole of the diaphragm.

The reflected light emitted by the defocused planes is thus limited thanks to the diaphragm 26 of the detection system 22: only light reflected at the focus F1 can pass through this diaphragm to excite the light-sensitive zone of the detection sensor 28.

Another portion of the flux is directed by reflection at the semi-reflecting mirror 25" along the axis transverse to the optical axis of the arrangement toward the discrimination system 23 in order to form a discrimination beam 5" converging toward another focus, separate from the light source 20 and the focus F2 of the beam 5' to be detected, and in the vicinity of which the discrimination system 23 is situated when the surface 2A (respectively 2B) is situated at the target distance.

Each of the sensors 28 and 29 produces an electrical voltage proportional to the received luminous intensity.

The operation of the optical probe will now be described with the aid of FIG. 5.

On this graph are represented (on the ordinate axis Y) the voltage values transmitted by the detection sensor 28 and the discrimination sensor 29 as a function of the relative distance (on the abscissa axis X) of the surface the position whereof is to be determined relative to the focus F1.

In order to determine the position of the surface of the object, the unit 8 commands the displacement means 10 until the probe reaches a distance from the surface in a detection range $I_2$ around the target distance; how it is obtained will be explained hereinafter.

During the displacement of the probe relative to the surface the position whereof is to be determined, the luminous intensities received by the detection system 22 and the discrimination system 23 vary: the detection sensor 28 supplies a detection signal illustrated by the curve 30 and the discrimination sensor 29 supplies a discrimination signal illustrated by the curve 40.

If the surface 2A (respectively 2B) of the object the position whereof is to be determined coincides with the focus F1 of the probe, the light of the beam 5' passes through the diaphragm 26 and illuminates the sensor 28 of the detection system 22. Conversely, if the focus F1 of the probe is moved away from the surface 2A (respectively 2B) or if the surface 2A (respectively 2B) is moved away from the focus F1, a very large portion of the reflected light no longer passes through the diaphragm 26 and the luminous intensity received by the sensor 28 decreases significantly.

The very small size of the diaphragm 26 leads to a high spatial selectivity, which is reflected in a very narrow voltage spike 31.

This small size leads to diffraction phenomena that are the cause of the squared cardinal sine type general shape of the curve 30, which explains the presence of secondary peaks 31', 31", etc.

The secondary peaks do not facilitate detection of the peak 31. In particular, nulling the derivative of the voltage signal produced by the sensor 28 would not distinguish between the various peaks. Threshold detection is possible but the value of the threshold would depend on the reflection ratio, that is to say, in the case of a spectacle lens, the index of the glass or the nature of the surface treatments. The threshold would therefore have to be adjusted for each type of surface and each type of material.

Figure 5:
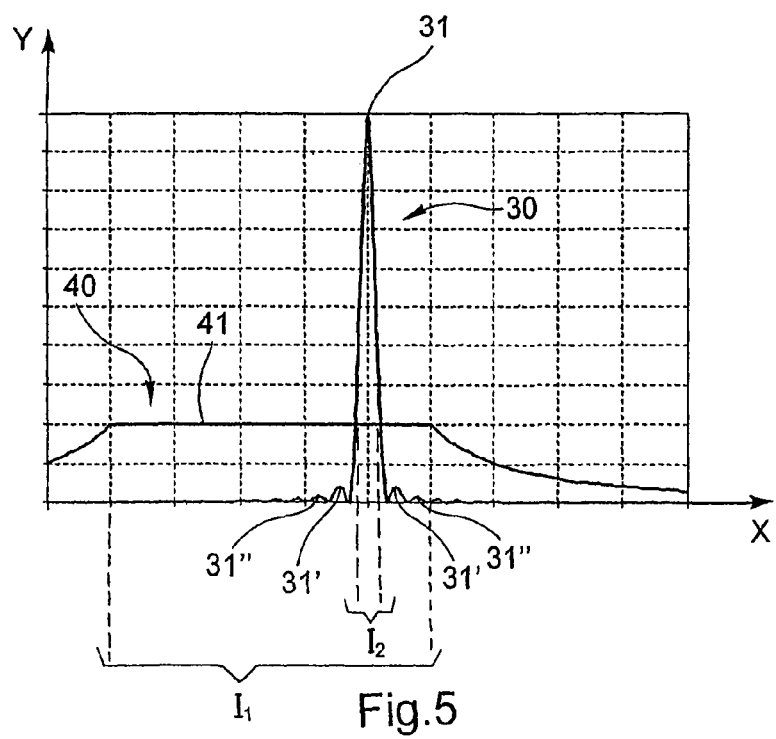
FIG. 5 is a graph showing the theoretical shape of the electrical signals emitted by the detectors of the optical probe as a function of the relative distance between the focus of the optical probe and the surface the position whereof is to be determined.

The discrimination system 23 introduces an automatically adjusted reference, in this instance the voltage produced by the sensor 29, illustrated by the curve 40 in FIG. 5.

The dimensions and position of the diaphragm 27 are such that it allows all of the light of the beam 5" to pass if the surface the position whereof is to be determined is situated in a range $I_1$ (FIG. 5): the signal emitted in this case corresponds to the plateau 41.

Outside this range $I_1$, a portion of the luminous flux is stopped by the diaphragm 27.

Accordingly, outside the plateau 41, a portion of the beam is intercepted by the diaphragm 27, and the signal then falls relative to the value of the plateau 41 in inverse proportion to the square of the distance from the surface 2A (respectively 2B).

When the discrimination signal illustrated by the curve 40 reaches the value of the plateau 41, and when the detection signal illustrated by the curve 30 exceeds the plateau 41 of the discrimination signal to reach the summit of the peak 31, the distance between the probe and the surface corresponds to the target distance (i.e. a null distance from the focus F1). Conversely, the secondary peaks, linked to the diffraction phenomenon, are lower than the value of the voltage signal from the discrimination sensor.

Figure 6:
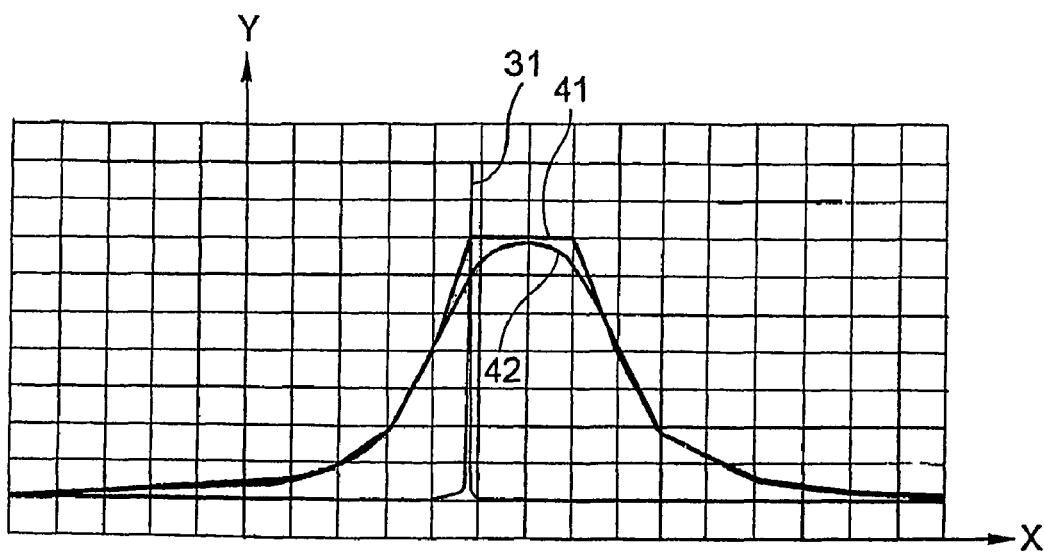
FIG. 6 shows on the same graph the theoretical discrimination signal and the detection signal and the discrimination signal that are obtained in practice.

In practice, the variation of the sensitivity of the sensor 29 between its center and its edges can lead to a modification of the plateau shape 41 of the discrimination signal, which will then assume a rounded convex shape 42 (FIG. 6).

Figure 7:
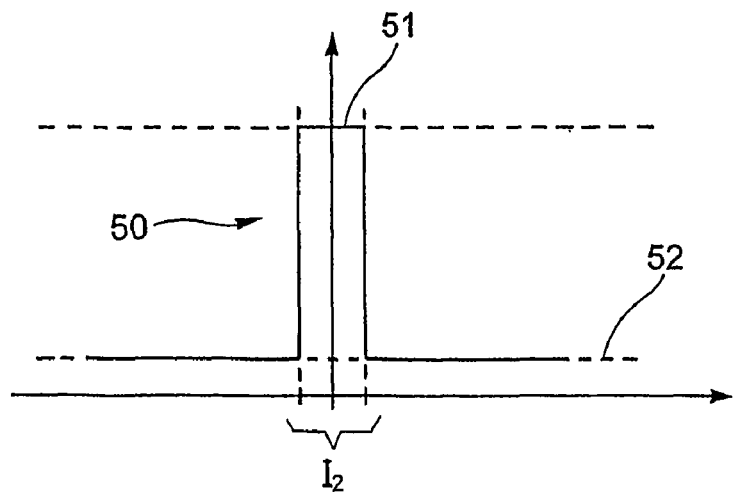
FIG. 7 is a graph representing the logic signal obtained after comparison of the detection and discrimination signals transmitted by the detectors of the optical probe as a function of the relative distance between the focus of the optical probe and the surface the position whereof is to be determined.

The range in which the value of the detection signal is greater than that of the discrimination signal corresponds to the detection range $I_2$ in which the surface is considered to coincide with the focus F1 of the probe. This is reflected in a logic signal illustrated by the curve 50 represented in FIG. 7, obtained by using a comparator 60 (FIG. 4) to compare the voltage values transmitted by the detection system 22 and the discrimination system 23, assuming a first logic state 51 if the distance between the focus F1 and the surface is in the range I₂ and a second logic state 52 otherwise.

Accordingly, the spatial width, equal to I₂, in which the logic signal assumes the state 51 corresponds to tolerance thresholds considered acceptable for determining the position of a surface: in the case of spectacle lenses, the range I₂ can have a width of ten micrometers, for example, which corresponds to a measurement inaccuracy value equal at most to plus or minus five micrometers for each surface the position whereof is to be determined.

TTL logic can be used to produce this signal, for example.

When the probe enters the detection range I₂, the central unit 8 commands stopping of the displacement of the probe and the position of the probe is read and transmitted to the electronic unit 7 by the reading head 15. The distance between the probe and the face the position whereof is to be determined being known and equal to the target distance, the position of the surface can be determined.

This detection mode may be described as differential because it is obtained by comparing values of two different signals obtained by two separate detectors.

This kind of detection mode is thus rendered independent of the amplitude of the signals, the secondary peaks, the index of the glass or the nature of the various layers covering it provided that they partially reflect light at the chosen wavelength emitted by the probe.

This kind of detection mode, by choosing a range I₁ wider than the range I₂, can detect the range I₂ "in advance". If the discrimination signal is approaching the plateau 41, that means that the probe is approaching the range I₂ and therefore the target distance, so that the fast travel of the probe can be slowed on approaching the target distance, for example.

The practical value of the target distance is deduced by calculation during a preliminary calibration phase in which the optical sensor is placed at the target distance from the surface of a calibration lens the thickness of which is known: the distance between the probe and the surface of the lens the position whereof is to be determined can then be obtained by simple comparison with the reference distance between the probe and the surface of the calibration lens when the probe is situated at the target distance.

The same positioning method can be applied, simultaneously or not, for the second principal face of the lens thanks to the second probe placed facing the latter and having identical means for displacement and reading of the position of the probe.

The thickness of the lens is deduced by the central unit 8 by simple comparison of the positions of the principal surfaces of the lens the thickness whereof is to be determined.

To obtain as compact as possible an optical probe, the diaphragms placed in front of the sensors are produced by making a hole in a sheet of black material. Each sheet is in contact with a block transparent to the light emitted by the light source 20, itself in contact with the sensor. These transparent blocks, not represented in the figures, are to increase the stiffness of the optical probe.

When assembling the probe, once all of the components of the optical probe are in position, those components are buried in a curable resin in order permanently to fix the positions and distances of the various components relative to each other so that the optical qualities of the probe are not degraded over time by displacement of the components.

In a variant that is not shown, the detection splitter block and the discrimination splitter block are not in contact, in order to shift the plateau 41 of the discrimination signal spatially relative to the peak 31 of the detection signal, for example to increase how far in advance the approach to the range I₂ is detected.

In another variant, the mirror 25" of the discrimination block 25 has a reflection/transmission ratio of 10/90 so as to transmit the maximum luminous flux for the detection signal, the large diameter of the hole in the diaphragm 27 enabling a discrimination signal to be obtained from a small quantity of light.

In a further variant, the splitter blocks are replaced by simple splitter mirrors.

In a further variant, the optical reading head 15 and the scale 16 on which the position is read are replaced by a LVDT linear displacement sensor (Linear Variable Differential Transformer).

The present invention is not limited to the embodiments described and represented and encompasses any execution variant.

What is claimed is:

1. Optical probe including opto-electrical means that assumes a predetermined electrical state when situating said probe (3) at a preset target distance from a surface (2A, 2B) that is at least partially reflective and assumes an electrical state other than said predetermined electrical state when situating said probe (3) at a distance other than the preset target distance from the surface (2A, 2B), said probe including:

a light source (20);

shaping means (24, 25, 21) for shaping a beam emitted by said light source into an incident beam (5) converging toward a focus (F1) situated at said target distance and for shaping the beam coming from said surface by virtue of reflection of said incident beam (5) when said surface is in the vicinity of said target distance into a beam (5') to be detected converging toward a focus (F2), separate from said light source, occupying a predetermined location when said surface is at said target distance; and an optical detection system (22) including a diaphragm (26) including a pinhole, disposed at said predetermined location, and a photoelectric sensor (28) producing a voltage peak (31) when said surface is at said target distance;

wherein:

said shaping means (24, 25, 21) also shape said beam coming from said surface into a discrimination beam (5") converging toward a focus separate from said light source and from said focus of the beam to be detected, occupying another predetermined location when said surface is at said target distance; and said probe further includes an optical discrimination system (23) including a diaphragm (27) including a hole larger than said pinhole, disposed at least in the vicinity of said other predetermined location, and a photoelectric sensor (29) producing a voltage higher than said voltage produced by said detection sensor (28) except when said surface (2A, 2B) is at the target distance, whereby said predetermined electrical state is that in which the voltage produced by the detection sensor (28) is greater than the voltage produced by the discrimination sensor (29).

2. Probe according to claim 1, wherein said shaping means include: a detection semi-reflecting splitter block (24) adapted to orient said beam (5') to be directed toward said detection system (22), a discrimination semi-reflecting splitter block (25) adapted to orient said discrimination beam (5") toward said discrimination system (23), and a lens assembly (21).

3. Probe according to claim 2, wherein said detection semi-reflecting splitter block (24) is disposed between said light source (20) and said discrimination semi-reflecting splitter block (25) and said discrimination semi-reflecting splitter block (25) is disposed between said detection semi-reflecting splitter block (24) and said lens assembly (21).

4. Probe according to claim 3, wherein said detection semi-reflecting splitter block (24) and said discrimination semi-reflecting splitter block (25) are in contact with each other.

5. Probe according to claim 4, wherein said detection system (22) is disposed facing said detection splitter block (24) transversely to the optical axis of the probe and said discrimination system (23) is disposed facing said discrimination splitter block (25) transversely to the optical axis of the probe.

6. Probe according to claim 4, wherein said detection splitter block (24) and said discrimination splitter block (25) each include a semi-reflecting mirror (24", 25") inclined at 45° to the optical axis of the probe.

7. Probe according to claim 3, wherein said detection system (22) is disposed facing said detection splitter block (24) transversely to the optical axis of the probe and said discrimination system (23) is disposed facing said discrimination splitter block (25) transversely to the optical axis of the probe.

8. Probe according to claim 3, wherein said detection splitter block (24) and said discrimination splitter block (25) each include a semi-reflecting mirror (24", 25") inclined at 45° to the optical axis of the probe.

9. Probe according to claim 2, wherein said detection system (22) is disposed facing said detection semi-reflecting splitter block (24) transversely to the optical axis of the probe and said discrimination system (23) is disposed facing said discrimination semi-reflecting splitter block (25) transversely to the optical axis of the probe.

10. Probe according to claim 2, wherein said detection semi-reflecting splitter block (24) and said discrimination semi-reflecting splitter block (25) each include a semi-reflecting mirror (24", 25") inclined at 45° to the optical axis of the probe.

11. Probe according to claim 10, wherein said semi-reflecting mirrors (24", 25") have a reflection/transmission ratio of 50/50.

12. Probe according to claim 10, wherein said semi-reflecting mirror (24") of the detection semi-reflecting splitter block has a reflection/transmission ratio of 50/50 and said semi-reflecting mirror (25") of the discrimination semi-reflecting splitter block has a reflection/transmission ratio of 10/90.

13. Probe according to claim 2, wherein said lens assembly (21) is formed by the association of a plano-convex lens (21') and an aspherical lens (21").

14. Probe according to claim 1, wherein said pinhole has a diameter from 10 to 30 micrometers.

15. Probe according to claim 1, wherein said light source (20) is a laser diode with integrated amplifier.

16. Probe according to claim 15, wherein the emission wavelength of said laser diode is from 635 to 1600 nanometers.

17. Probe according to claim 15, wherein light is emitted directly from said laser diode as far as the detection splitter block (24).

18. Probe according to claim 1, wherein said light source (20), said shaping means (24, 25, 21), said detection system (22) and said discrimination system (23) are fastened together by encapsulating them by casting a resin that holds them in position relative to each other.

19. A device for measuring the thickness of an object (2) on the surfaces (2A, 2B) whereof between which the thickness is to be measured are at least partly reflective, said device includes:
   two probe arms on respective opposite sides of said object (2) each including a probe (3) according to claim 1 and displacement means (10) for said probes;
   for each probe arm, a reading head (15) for determining the position of that arm on a scale (16); and
   electronic units (7, 8) for controlling said displacement means (10), for reading the position of said probes and for calculating said thickness of said object when said probes are situated at said preset target distances.

20. Method for measuring the thickness of an optical lens including the step of positioning the probe of each probe arm of the thickness measuring device according to claim 19 at said target distance relative to said surface facing which it is disposed and the step of determining said thickness by comparison of said positions of said probes.

* * * * *